Patented Apr. 13, 1926.

1,580,914

UNITED STATES PATENT OFFICE.

MAX PHILLIPS, OF EVANSVILLE, WISCONSIN, AND MARSHALL J. GOSS, OF ASHLAND, OHIO, DEDICATED, BY MESNE ASSIGNMENTS, TO THE PEOPLE OF THE UNITED STATES.

VARNISH AND PAINT REMOVER.

No Drawing. Application filed October 24, 1925. Serial No. 64,707.

(GRANTED UNDER THE ACT OF MARCH 3, 1883; 22 STAT. L. 625.)

*To all whom it may concern:*

Be it known that we, MAX PHILLIPS and MARSHALL J. GOSS, citizens of the United States of America, and employees of the Department of Agriculture, residing in the city of Evansville, county of Rock, State of Wisconsin, and in the city of Ashland, county of Ashland, State of Ohio, respectively, whose post-office addresses are Department of Agriculture, Washington, D. C., have invented a new and useful Varnish and Paint Remover.

This application is made under the act of March 3, 1883, chapter 143 (22 Stat. L. 625), and the invention herein described and claimed is hereby dedicated to the free use of the Government and the public without payment to us of any royalty thereon.

p-cymene (1-methyl-4-isopropyl-benzene) is an aromatic hydrocarbon which is obtained as a by-product in the preparation of wood-pulp. Hitherto no extensive use for this product has been found.

We have found that p-cymene when mixed with 95% ethyl alcohol, acetone, methyl alcohol, isopropyl alcohol, n. butyl alcohol or methyl ethyl ketone in various proportions produces a mixture which is very effective as a varnish or paint remover.

We shall illustrate our invention by describing the various mixtures of the solvents we have used and the manner in which we have employed them without limiting ourselves to the special concentration of the solvents employed.

One preparation that we use consists of equal volumes of p-cymene and 95% ethyl alcohol. This mixture is applied to the surface from which it is desired to remove the varnish and allowed to remain for two or three minutes after which the varnish can be removed with a cloth.

To remove paint we proceed in the same manner as above described except that the alcohol-cymene mixture is allowed to remain in contact with the painted surface for a few minutes longer after which the paint becomes softened and may be readily removed by means of a knife, scraper, or stiff brush.

Although we prefer to use the alcohol-cymene mixture in the concentration of equal volumes of each, other mixtures as for example, 1 vol. 95% ethyl alcohol to 2 vol. of p-cymene; 1 vol. 95% ethyl alcohol to 3 vol. of p-cymene; 2 vol. 95% ethyl alcohol to 1 vol. p-cymene; 3 vol. of 95% ethyl alcohol to 1 vol. p-cymene, are also effective in the removal of varnish and paint.

Other preparations which we use to remove varnish and paint are made by mixing p-cymene with other solvents such as acetone, methyl alcohol, isopropyl alcohol, n. butyl alcohol, and methyl ethyl ketone.

Having thus described our invention, we claim:

1. A varnish and paint remover comprising p-cymene and 95% ethyl alcohol.
2. A varnish and paint remover comprising p-cymene and acetone.
3. A varnish and paint remover comprising p-cymene and methyl alcohol.
4. A varnish and paint remover comprising p-cymene and isopropyl alcohol.
5. A varnish and paint remover comprising p-cymene and n. butyl alcohol.
6. A varnish and paint remover comprising p-cymene and methyl ethyl ketone.

In testimony whereof, we affix our signatures in the presence of two subscribing witnesses.

MAX PHILLIPS.
MARSHALL J. GOSS.